K. MIRAM & L. SEIDEL.
ELECTROMAGNETIC CLUTCH.
APPLICATION FILED FEB. 13, 1911.
1,031,081.
Patented July 2, 1912.
2 SHEETS—SHEET 1.
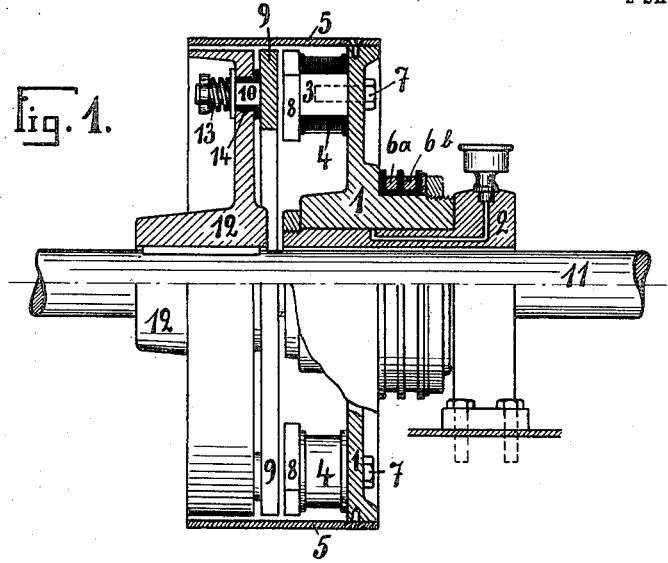
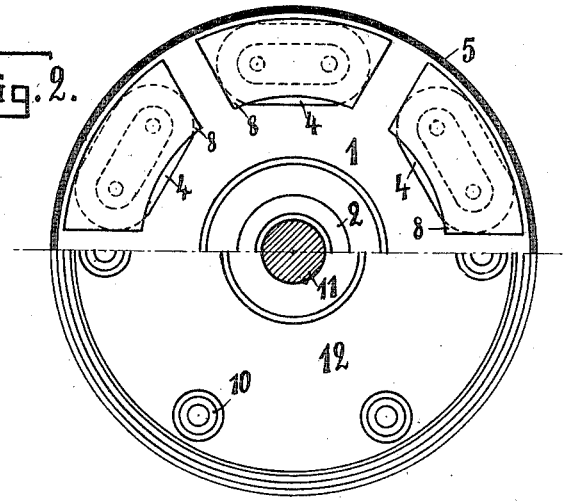
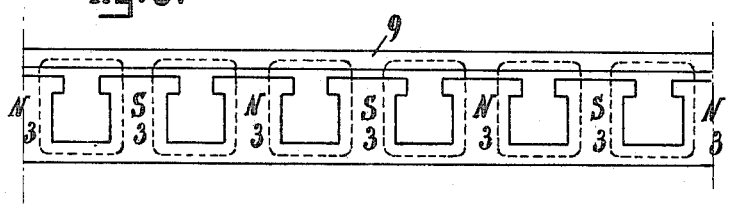
WITNESSES:
John C. Sanders
John A. Percival
INVENTORS:
Kurt Miram + Lothar Seidel
BY
ATTY.

K. MIRAM & L. SEIDEL.
ELECTROMAGNETIC CLUTCH.
APPLICATION FILED FEB. 13, 1911.
1,031,081.
Patented July 2, 1912.
2 SHEETS—SHEET 2.
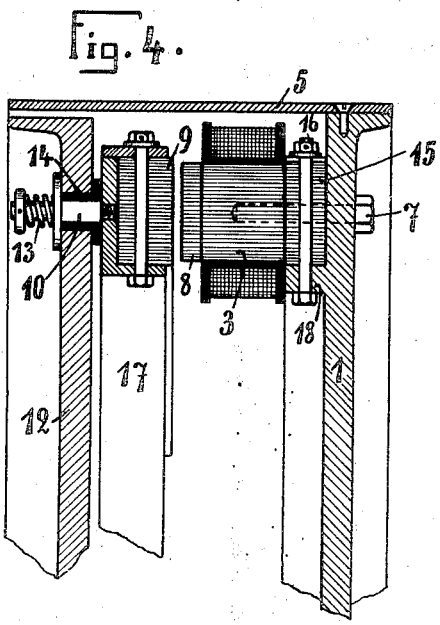
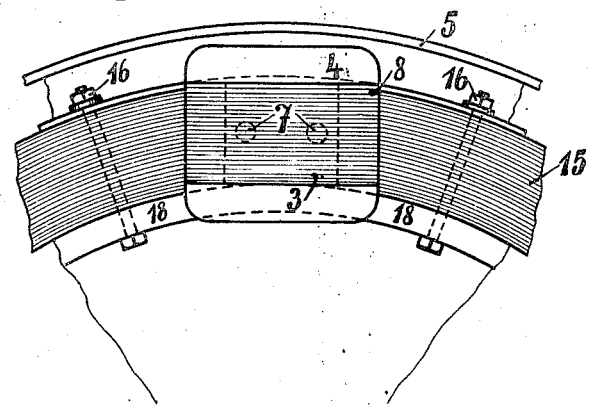
WITNESSES:
John C. Sanders
John A. Percival
INVENTORS:
Karl Miram + Lothar Seidel
BY
ATT'Y.

UNITED STATES PATENT OFFICE.

KURT MIRAM AND LOTHAR SEIDEL, OF AACHEN, GERMANY.

ELECTROMAGNETIC CLUTCH.

1,031,081.   Specification of Letters Patent.   Patented July 2, 1912.

Application filed February 13, 1911. Serial No. 508,348.

*To all whom it may concern:*

Be it known that we, KURT MIRAM and LOTHAR SEIDEL, citizens of the German Empire, residing at Aachen, Germany, have invented new and useful Improvements in Electromagnetic Clutches, of which the following is a specification.

This invention has for its object various improvements in electro-magnetic friction clutches. These improvements enable a rapid, powerful and yet gentle coupling to be made without violent shock or vibration. This result is obtained by decreasing as far as possible the mass of the moving parts. These improvements allow a certain amount of movement between the two parts of the clutch so that inequalities in the position of the axles are provided for. Moreover the clutch surfaces always remain in firm contact with each other if these surfaces, in consequence of inexact movements or wear, are not exactly parallel to each other. Another object of the invention is to provide such a construction of the magnets and the armature that the use of either single or multiphase alternating current is possible.

To carry out the first part of our invention we arrange, on one half of the friction clutch, electro-magnets, the pole surfaces of which either lie in one plane at right-angles to the axis, or the pole surfaces of which lie on the surface of a cone, which latter must be coaxial with the shaft. The axes of all poles may lie on one or more circles, concentric with the axis. The coils of the magnets are connected in such a way that poles following each other are of opposite polarity. The two or more terminals of the winding are connected to slip rings, which latter are arranged on the side of the half clutch opposite the one to which the poles are connected. The half of the clutch heretofore described may preferably, but need not necessarily, be the one which receives the power from the source of energy. According to the method of driving, or the purpose for which the clutch is intended, this half of the clutch may either be keyed to a shaft or can run loosely on the shaft or a sleeve.

The second half of the clutch consists of two distinct parts, viz., the driving disk and the armature. The driving disk, in clutches constructed in accordance with our invention, is invariably held at a fixed distance from the other half of the clutch which carries the magnets, while the armature is connected to the driving disk in such a way that the first part is axially but not rotatably movable with respect to the second part. In this respect the present invention is different from the already known couplings, in which the whole power transmitting disk must be displaced, so that the moving masses can never be very small. From this it follows that the attraction of the disk takes place more quickly and yet with a light blow. In order to give the coupling a certain elasticity or flexibility, the connection between the power transmitting disk and the armature is advantageously made by means of studs, which latter are loosely guided in the driving disk in order to allow the armature a certain amount of movement at an angle to the axis, in case it should not be at right-angles to the axis in the first instance, so that any inaccuracies in its position are automatically eliminated by the slight angular motion of the armature, until its surface is parallel with the ends of the poles.

In the "rest" position of the clutch, the armature lies against the driving disk and is held in this position by means of springs, mounted between the driving disk and the heads of the guide studs.

In order to increase the flexibility, the guide holes for the pins in the driving disk may be lined with rubber, or some other elastic medium. The flexibility of the armature can also be obtained by other means instead of the loosely fitted studs, such as springs and such like.

Figures 1 and 2 show an example of a construction of a clutch in accordance with our invention for continuous current; Fig. 1 being a longitudinal section, Fig. 2 being a similar view of the magnet disk looked at from the pole ends, Fig. 3 shows the development of the poles, the magnetic flux being connected by dotted lines; Figs. 4 and 5 show a clutch for use with single or multiphase alternating current; Fig. 4 being a partial longitudinal section, Fig. 5 being a partial view of the disk showing a magnet pole.

In the drawings 1, in Fig. 1, is the driving part of the clutch, which, in this case, is assumed to receive the energy by means of belt, gear wheels or other suitable connection to the source of energy, and is shown mounted on a sleeve, which latter is made in one with the bearing. The current is supplied by means of slip rings 6ª and 6ᵇ. The pole cores, shown in the drawing, are firmly connected with the disk 1, by means of screws 7. They may, however, be cast in one piece with the disk 1. It is preferable, but not necessary, to provide the separate poles with extended pole shoes 8; Fig. 1, and upper half of Fig. 2.

4 are the coils arranged on the separate magnets. The part 12 forms the second half of the clutch, and is, in the case of the example, shown rigidly keyed to shaft 11, but for certain applications it may be suitable to run this part either loose on the shaft, or on a separate sleeve. 9 is the armature ring connected to the part 2 by means of studs 10, and in the "rest" position held resting against part 2, by means of spring 13. 14 indicates the bushes made from elastic material.

Fig. 3 shows the development of the poles, the magnetic flux between the poles and the armature disk being indicated by dotted lines. It will be seen that north pole and south pole follow each other, and that two adjoining poles act like a horse-shoe magnet. In case the magnet poles are arranged with their ends lying on a cone surface, the armature must also be arranged as part of a cone, but otherwise the construction would be the same.

In the case of single or multi-phase alternating current clutches, the construction as shown in Figs. 4 and 5 may be substantially the same, but all iron forming part of the magnetic circuit must be laminated in the direction of the magnetic flux.

The disk 1 is formed with a carrier or support 18, which serves for receiving an iron band winding 15 (after the manner of the armature construction of the Schuckert flat ring dynamo), which is held in position by bolts 16. On this winding 15, the poles 3, are mounted at uniform intervals, and again carry the coils 4, and the like. The pole shoes 8 are preferably made in one piece with the poles. The connection of the poles to the carrier is again effected by means of screws 7. The armature ring 9 is also again made as a strip winding which is held by the carrier or support 17, the latter being connected to disk 12, flexibly, as described heretofore. The action is exactly the same as the one hereinbefore described.

We do not limit our invention, which relates to alternating current couplings, to the arrangement of the movable armature 9 on the power-transmitting disk 12. The armature can also be attached rigidly to the disk, so that the disk is axially displaceable with the armature.

Having now particularly described and ascertained the nature of our said invention and in what manner the same is to be performed, we declare that what we claim is:—

1. In electromagnetic clutches suitable for continuous or single or multiphase alternating current, the combination with a disk rigidly attached to one of the two parts to be coupled, said disk supporting separate magnet cores the centers of which lie on a circle, and the end surfaces of their poles lie on a rotating face, of a second disk rigidly attached to the other of the two parts to be coupled, and an armature supporting a corresponding rotating face and mounted on said second disk so as to be axially but not rotatably displaceable.

2. In electromagnetic clutches suitable for continuous or single or multiphase alternating current, the combination with a disk rigidly attached to one of the two parts to be coupled, said disk supporting separate magnet cores the centers of which lie on a circle, and the end surfaces of their poles lie on a rotating face, of a second disk rigidly attached to the other of the two parts to be coupled, and an armature supporting a corresponding rotating face and mounted on said second disk so as to be axially but not rotatably displaceable, and means by which said armature in the coupled position is made flexible, whereby a slight angular displacement relatively to said second disk is permitted.

3. In electromagnetic clutches suitable for single or multiphase alternating current, the combination with a disk rigidly attached to one of the two parts to be coupled, said disk supporting separate magnet cores the centers of which lie on a circle and the end surfaces of their poles lie on a rotating face, said cores being laminated in the direction of the magnetic flux, of a disk attached to the other of the two parts to be coupled and an axially displaceable armature supporting a corresponding rotating face and mounted on said second disk, said armature being also laminated in the same manner.

In testimony whereof we have signed our names to this specification in the presence of two subscribing witnesses.

KURT MIRAM.
LOTHAR SEIDEL.

Witnesses:
HENRY CUDSLIEG,
ELISE KOELBURN.